(12) United States Patent
Ishii et al.

(10) Patent No.: US 9,409,480 B2
(45) Date of Patent: Aug. 9, 2016

(54) DISPLAY APPARATUS

(75) Inventors: Masaki Ishii, Yokohama (JP); Hiroshi Watanabe, Yokohama (JP); Kazuhiro Takefuji, Astugi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 1650 days.

(21) Appl. No.: 12/752,922

(22) Filed: Apr. 1, 2010

(65) Prior Publication Data

US 2010/0265418 A1   Oct. 21, 2010

(30) Foreign Application Priority Data

Apr. 21, 2009   (JP) .................. 2009-102661

(51) Int. Cl.
*B60K 35/00* (2006.01)

(52) U.S. Cl.
CPC ..................... *B60K 35/00* (2013.01)

(58) Field of Classification Search
CPC ........................................ B60K 35/00
USPC ............ 348/148, 143, 118, 113, 144
See application file for complete search history.

(56) References Cited

U.S. PATENT DOCUMENTS

2003/0055559 A1* 3/2003 Kuroda et al. ............... 701/208
2003/0062827 A1* 4/2003 Nagai et al. .................. 313/504

FOREIGN PATENT DOCUMENTS

| CN | 101133439 A | 2/2008 |
|---|---|---|
| DE | 102008017787 A1 | 10/2008 |
| EP | 1209628 A1 | 5/2002 |
| EP | 1288618 A2 | 3/2003 |
| EP | 1297989 A2 | 4/2003 |
| JP | 2008030638 A | 2/2008 |

OTHER PUBLICATIONS

English Abstract of JP2008030638 from esp@cenet, published Feb. 14, 2008 (1 page).
Office Action issued in Chinese Application No. 201010149760.0 mailed on Jun. 24, 2013 (6 pages).
Extended European Search Report issued in Application No. 10159294.7, dated Apr. 25, 2013 (4 pages).

* cited by examiner

*Primary Examiner* — Anner Holder
(74) *Attorney, Agent, or Firm* — Osha Liang LLP

(57) ABSTRACT

A display apparatus provided on a surface of a panel, the display apparatus includes a quadrangular window section provided in the surface, an image display surface disposed in and recessed from the quadrangular window section, a frame configured to surround the image display surface and extend from the image display surface to the quadrangular window section, in which the frame includes an inside edge formed in a substantially trapezoidal shape having a shorter upper edge and a longer lower edge, and an outside edge formed in a quadrangular shape conforming to the quadrangular window section, in which a difference in length in a lateral direction between the shorter edge of the inside edge and an upper edge of the outside edge is set larger than a difference in length in the lateral direction between the longer edge of the inside edge and a lower edge of the outside edge.

20 Claims, 5 Drawing Sheets

DISPLAY APPARATUS

CROSS-REFERENCE TO RELATED APPLICATIONS

The present application claims priority from Japanese Patent Application No. 2009-102661, filed Apr. 21, 2009. The contents of this priority application are hereby incorporated by reference in their entirety.

BACKGROUND OF THE DISCLOSURE

1. Field of the Disclosure

The present disclosure relates to a vehicular display apparatus provided with an image display surface for displaying imagery on a meter display surface of an instrument panel.

2. Description of the Related Art

Japanese Patent Application Laid-Open No. 2008-30638 discloses a vehicular display apparatus in which an image display surface is inclined at a large angle in a vehicle forward direction with respect to a meter display surface, so as to produce a perspective effect.

However, in the conventional vehicular display apparatus, a structure around the image display surface may be subject to a restriction in layout because the image display surface may be physically inclined at a large angle in the vehicle forward direction so as to enhance the perspective effect.

SUMMARY OF THE CLAIMED SUBJECT MATTER

In one aspect of the present disclosure, a display apparatus is provided on a surface of a panel. The display apparatus includes a quadrangular window section provided in the surface, an image display surface disposed in and recessed from the quadrangular window section, a frame configured to surround the image display surface and extend from the image display surface to the quadrangular window section, in which the frame includes an inside edge formed in a substantially trapezoidal shape having a shorter upper edge and a longer lower edge, and an outside edge formed in a quadrangular shape conforming to the quadrangular window section, in which a difference in length in a lateral direction between the shorter edge of the inside edge and an upper edge of the outside edge is set larger than a difference in length in the lateral direction between the longer edge of the inside edge and a lower edge of the outside edge.

In another aspect of the present disclosure, a display apparatus is provided on a display surface of a panel. The display apparatus includes a quadrangular window section provided in the display surface, a means for displaying an image provided in the display surface, a means for recessing configured to dispose the means for displaying an image in and recessed from the quadrangular window section, a frame configured to surround the means for displaying an image and extend from the means for displaying an image to the quadrangular window section, in which the frame includes an inside edge formed in a substantially trapezoidal shape having a shorter upper edge and a longer lower edge, and an outside edge formed in a quadrangular shape conforming to the quadrangular window section, in which a difference in length in a lateral direction between the shorter edge of the inside edge and an upper edge of the outside edge is set larger than a difference in length in the lateral direction between the longer edge of the inside edge and a lower edge of the outside edge.

In another aspect of the present disclosure, a method to display an image on a display surface of a panel is provided. The method includes disposing a quadrangular window on the display surface of the panel, disposing an image display surface in the quadrangular window, wherein the image display surface is recessed from the window, disposing a frame configured to surround the image display surface and extend from the image display surface to the quadrangular window section, in which the frame includes an inside edge formed in a substantially trapezoidal shape having a shorter upper edge and a longer lower edge, and an outside edge formed in a quadrangular shape conforming to the quadrangular window section, in which a difference in length in a lateral direction between the shorter edge of the inside edge and an upper edge of the outside edge is set larger than a difference in length in the lateral direction between the longer edge of the inside edge and a lower edge of the outside edge.

BRIEF DESCRIPTION OF DRAWINGS

Features of the present disclosure will become more apparent from the following description in conjunction with the accompanying drawings.

DETAILED DESCRIPTION

Figure 1:
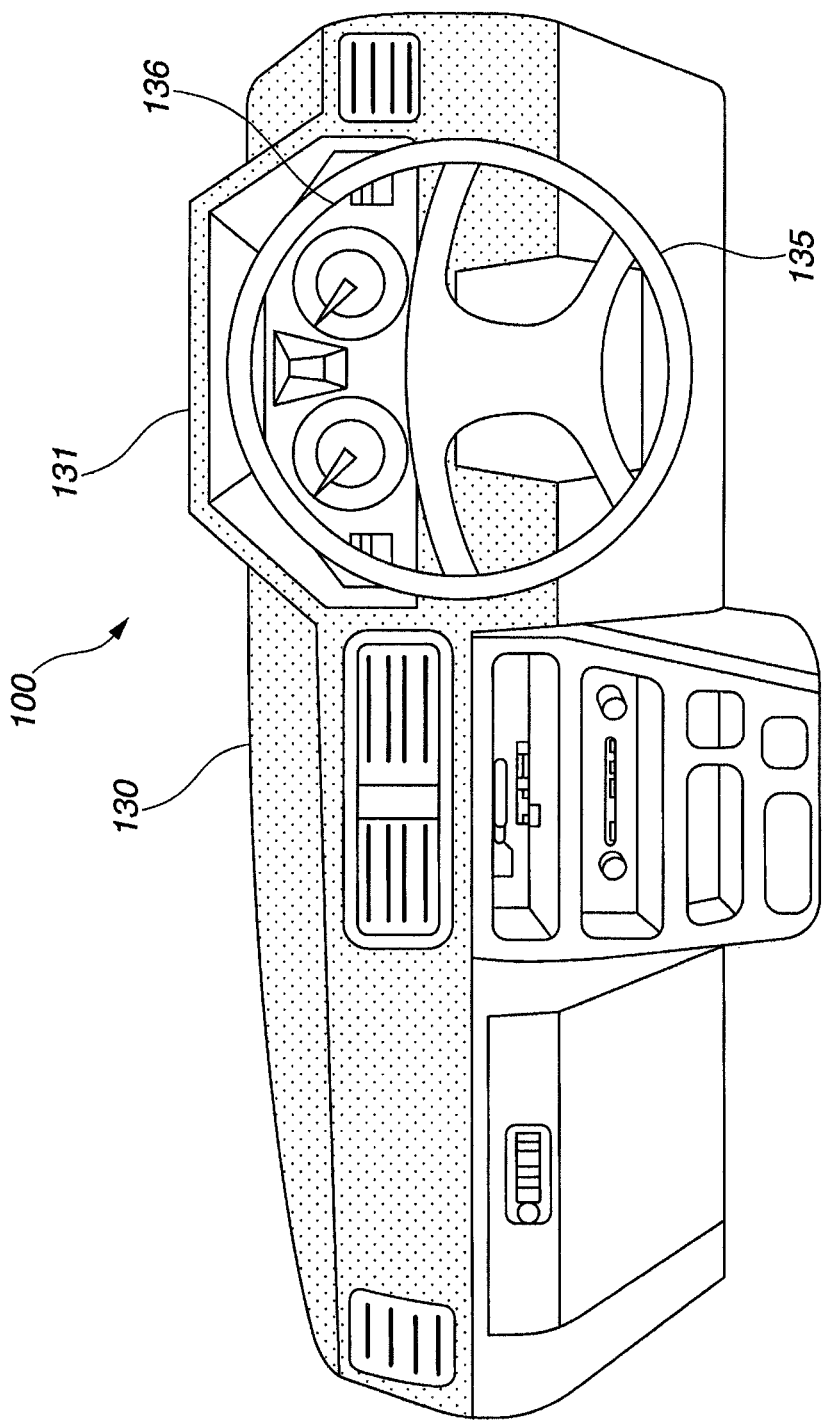
FIG. 1 is a rear view of a vehicle, showing a vehicular display apparatus in accordance with one or more embodiments of the present disclosure.

A construction and operation of a vehicular display apparatus according to embodiments of the present disclosure will be explained hereinafter by referring to the accompanying drawings.

The following describes construction of a vehicular display apparatus 100 according to one or more embodiments of the present disclosure. As shown in FIGS. 1 through 6, vehicular display apparatus 100 may be provided with a display surface 111 as an image display surface, and a display frame part 115 as a frame surrounding an outside edge of display surface 111. Display surface 111 may be disposed in a position corresponding to an opening 107 as a window section provided at a meter panel 120 as a meter display surface of an instrument panel 130 mounted at a front part of a vehicle body.

Meter panel 120 may be covered by a meter hood part 131. A plurality of meter sections 125, such as substantially circular meters including, for example, a speedometer and a tachometer, may be provided at a meter base surface 121 of meter panel 120.

Figure 6:
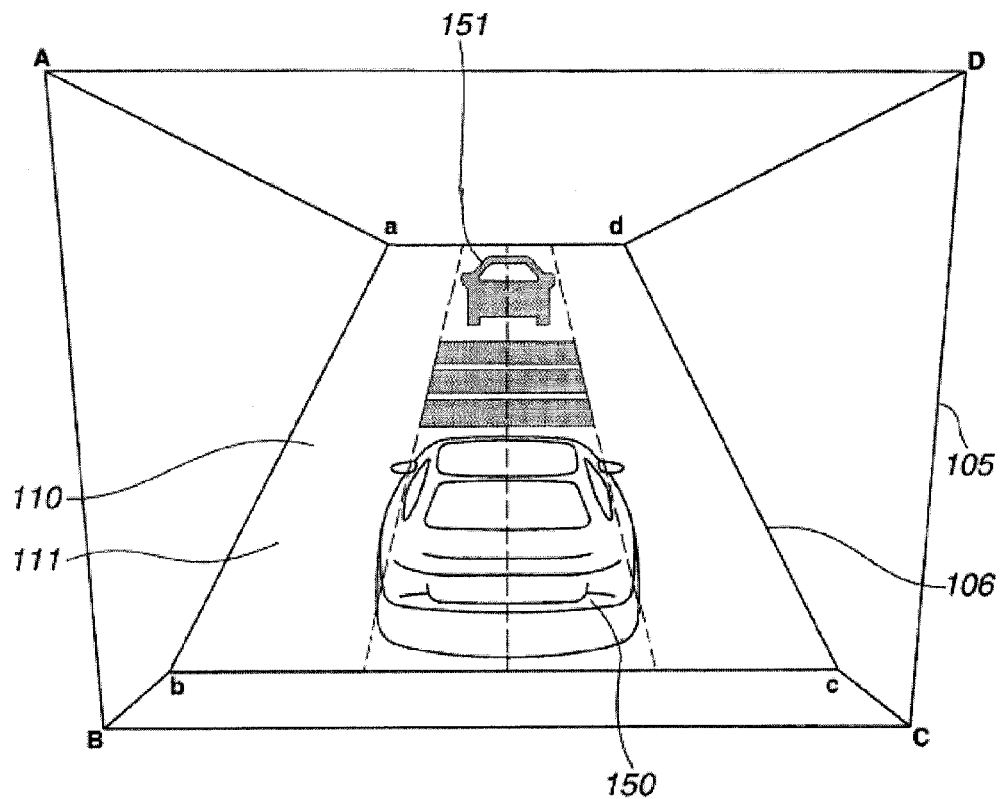
FIG. 6 is a diagram showing an image on the display surface in accordance with one or more embodiments of the present disclosure.

A display 110 may be disposed on a vehicle forward side of meter base surface 121 of meter panel 120. Display surface 111 of display 110 may be composed of an LCD panel, an organic EL panel, or any other display panel known in the art which may be capable of displaying imagery in a substantially trapezoidal shape having a shorter upper edge and a longer lower edge. Display surface 111 may be inclined in the vehicle forward direction with respect to meter base surface 121 so that the upper edge may be located on the vehicle forward side of the lower edge. Display surface 111 may be visually recognized from the inside of a passenger compartment through a steering opening 136 of a steering handle 135. For example, the imagery may be in the form of a perspective view from the rear and upper side of a traveling vehicle, as shown in FIG. 6, showing an inter-vehicular distance between a host vehicle 150 and another vehicle 151 traveling ahead. The imagery may also include objects or vehicles to the side or behind the traveling vehicle, or may include other perspectives or views as necessary to provide views for a specified purpose.

Figure 2:
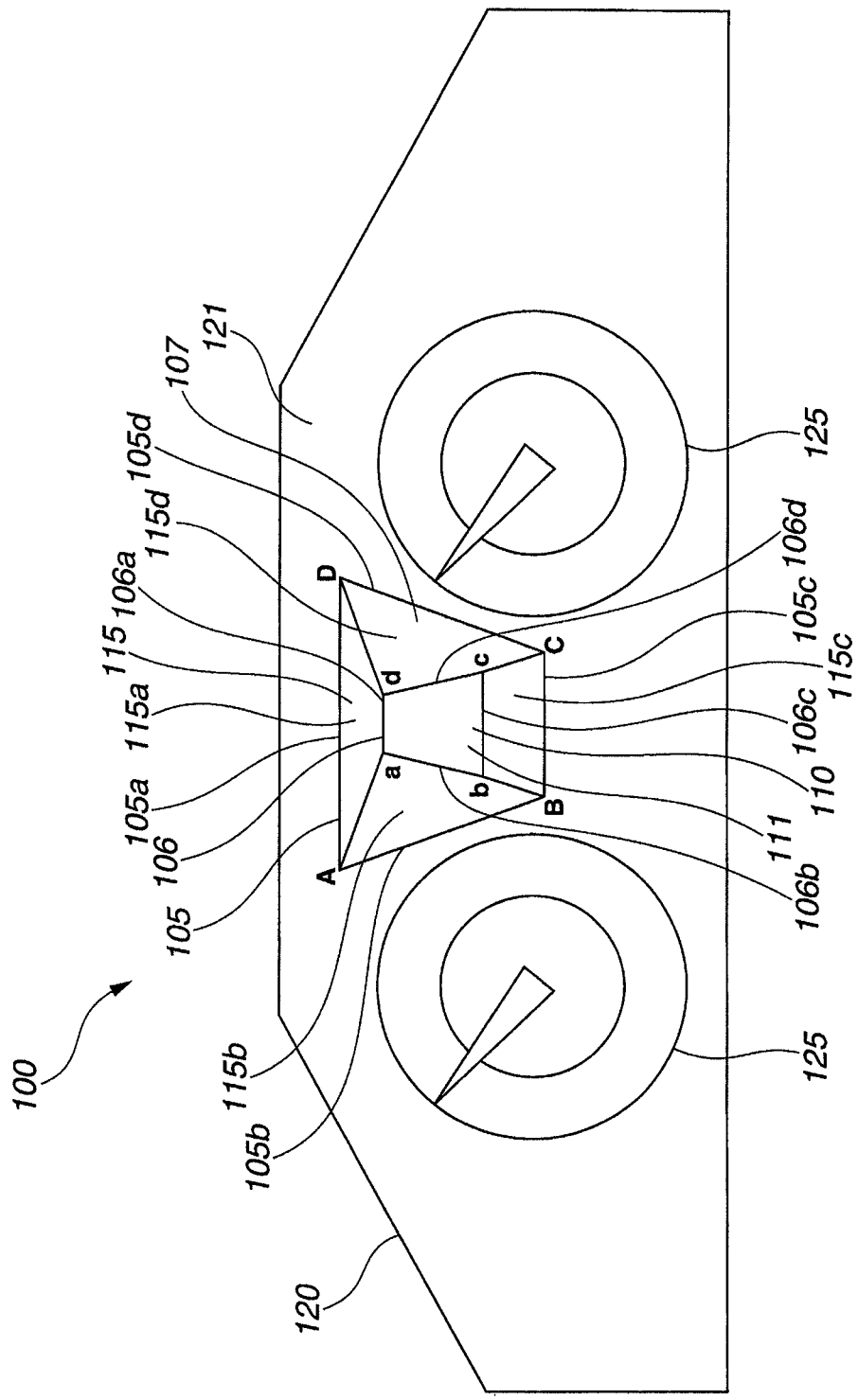
FIG. 2 is an enlarged view of a meter display surface, showing a vehicular display apparatus in accordance with one or more embodiments of the present disclosure.

Now referring to FIG. 2, display frame part 115 may be composed of four surfaces, i.e., a surface 115a (surface AadD), a surface 115b (surface ABba), a surface 115c (surface bBCc), and a surface 115d (surface dcCD). Each surface may be formed with an inclination so as to surround display surface 111, extending from meter base surface 121 of meter panel 120 in the vehicle forward direction. Display frame part 115 may include a display frame outside edge portion 105 as an outside edge formed in a quadrangular shape which may conform to the shape of opening 107 in meter base surface 121. Display frame part 115 may also include a display frame inside edge portion 106 as an inside edge formed in a substantially trapezoidal shape so as to surround the edge of display surface 111. Display frame part 115 may be disposed between the upper parts of the substantially circular meter sections 125 and may extend along the outside edges of meter sections 125.

Surfaces 115a-d may be made of resin, plastic, metal, and/or other suitable framing materials. Further, the surfaces may have grain and/or corrugation densities that may vary across the surface, as described below. Furthermore, although described herein as grains and corrugations, surfaces 115a-d may have alternative surfaces, such as lines, granulations, and/or other geometries and/or surface structures, without deviating from the scope of the present disclosure.

Figure 4:
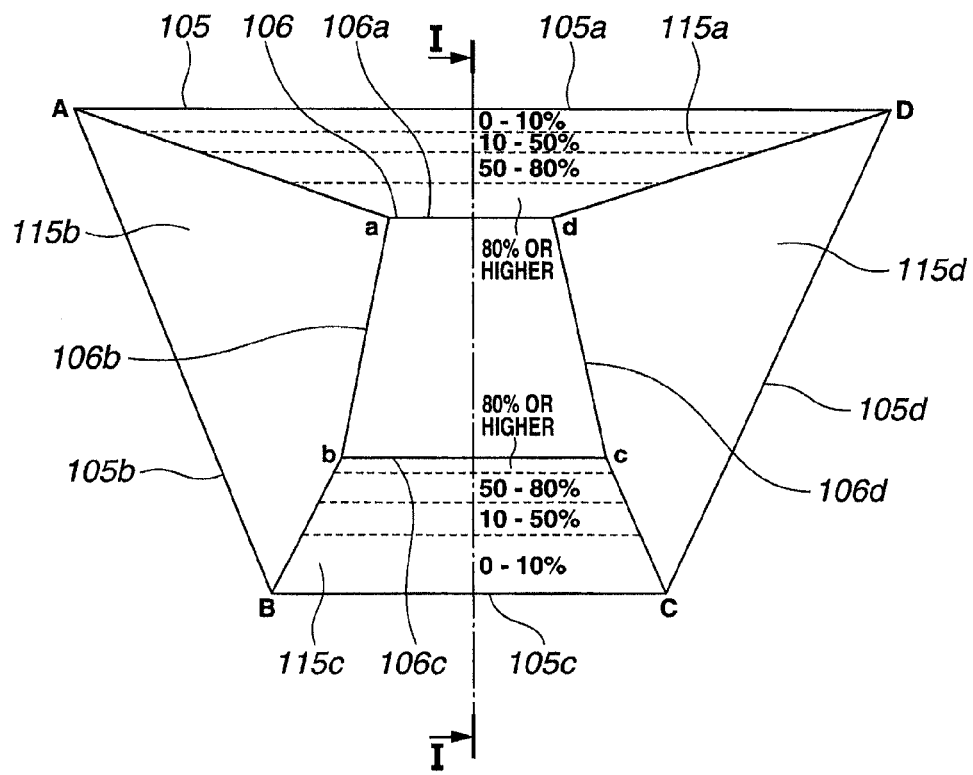
FIG. 4 is a diagram showing a frame and an image display surface in detail in a vehicular display apparatus in accordance with one or more embodiments of the present disclosure.
Figure 5:
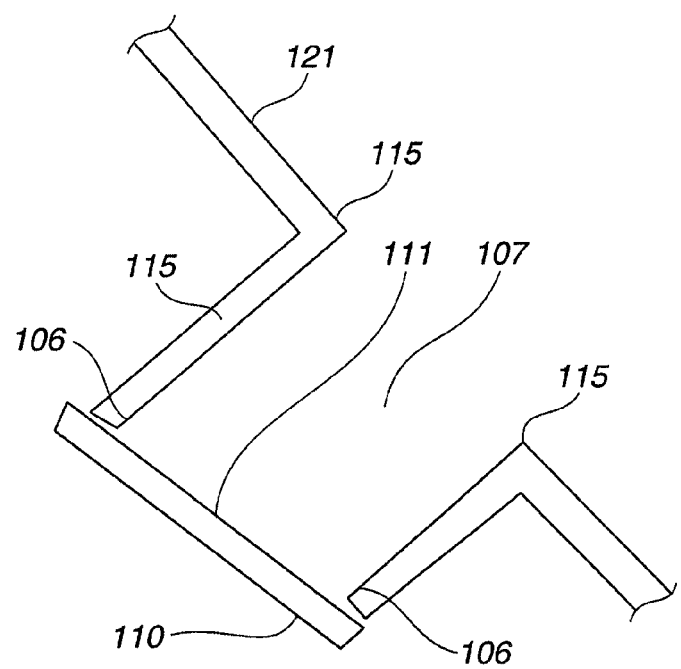
FIG. 5 is a sectional view of the vehicular display apparatus in accordance with one or more embodiments of the present disclosure, taken along the line I-I in FIG. 4.

Surface 115a (surface AadD) and surface 115c (surface bBCc) of display frame part 115 may be provided with a gradation. Specifically, in surface 115a (surface AadD) of display frame part 115, the density of grains may be set to increase as followed from display frame outside edge portion 105 to display frame inside edge portion 106. More specifically, as shown in FIG. 4, surface 115a (surface AadD) may be divided into areas of 0-10%, 10-50%, 50-80%, and 80% or higher which may be arranged from the display frame outside edge portion 105, so that the density of grains may increase as followed toward display frame inside edge portion 106. The depth size of the area of 0-10% may be set the smallest; the depth size of the area of 10-50% may be set larger than that of the area of 0-10%; the depth size of the area of 50-80% may be set larger than that of the area of 10-50%; and the depth size of the area of 80% or higher may be set larger than that of the area of 50-80%. This may suppress reflection of light at display frame inside edge portion 106 of surface 115a (surface AadD), and may allow for reflection of light at display frame outside edge portion 105 so that surface 115a (surface AadD) may become brighter with reflection of light as followed toward meter base surface 121.

Similar to surface 115a (surface AadD), in surface 115c (surface bBCc), the density of grains may be set to increase as followed from display frame outside edge portion 105 to display frame inside edge portion 106. However, in contrast to surface 115a (surface AadD), in surface 115c (surface bBCc), the depth size of the area of 0-10% may be set the largest; the depth size of the area of 10-50% may be set smaller than that of the area of 0-10%; the depth size of the area of 50-80% may be set smaller than that of the area of 10-50%; and the depth size of the area of 80% or higher may be set smaller than that of the area of 50-80%. This may suppress the reflection of light at display frame inside edge portion 106 of surface 115c (surface bBCc), and may allow the reflection of light at display frame outside edge portion 105 so that surface 115c (surface bBCc) may become brighter with the reflection of light as followed toward meter base surface 121. The variation of the brightness of light by grains may make it possible to enhance the perspective effect of display surface 111. As compared to surface 115c (surface bBCc), the area of surface 115a (surface AadD) in which the density of grains may be high may have a larger depth size so that surface 115a (surface AadD) may be darker than surface 115c (surface bBCc). This may create an illusion that surface 115a (surface AadD) may be located farther away from a viewer with respect to meter base surface 121, which may further enhance the perspective effect.

Display frame inside edge portion 106 may have a substantially trapezoidal shape abcd composed of an upper edge 106a (upper edge ad) as a shorter edge, a left edge 106b (left edge ab), a lower edge 106c (lower edge bc) as a longer edge, and a right edge 106d (right edge cd), where upper edge 106a (upper edge ad) may be shorter than lower edge 106c (lower edge bc). Display frame inside edge portion 106 may cover display surface 111 of display 110, and may define the shape of display surface 111 that may be viewed from the inside of the passenger compartment. Because display frame inside edge portion 106 may be in the form of the substantially trapezoidal shape, display 110 may have a substantially trapezoidal shape as viewed from the inside of the passenger compartment. Although the size of display frame inside edge portion 106 may be set equal to that of display surface 111 in one or more embodiments of the present disclosure, display surface 111 may be alternatively formed larger than display frame inside edge portion 106.

Display frame outside edge portion 105 may be composed of an upper edge 105a (upper edge AD), a left edge 105b (left edge AB), a lower edge 105c (lower edge BC), and a right edge 105d (right edge CD), which may have a substantially trapezoidal shape ABCD conforming to opening 107 where lower edge 105c (lower edge BC) may be formed shorter than upper edge 105a (upper edge AD). Lower edge 105c (lower edge BC) of display frame outside edge portion 105 may be formed to extend substantially parallel to lower edge 106c (lower edge bc) of display frame inside edge portion 106, and may be longer than lower edge 106c (lower edge bc). Upper edge 105a (upper edge AD) of display frame outside edge portion 105 may be formed to be substantially parallel to upper edge 106a (upper edge ad) of display frame inside edge portion 106, where the length of upper edge 105a (upper edge AD) may be longer than that of lower edge 105c (lower edge BC) of display frame outside edge portion 105.

With regard to the relationship between display frame outside edge portion 105 and display frame inside edge portion 106, the difference in length in the vehicle lateral direction between upper edge 106a (upper edge ad) of display frame inside edge portion 106 and upper edge 105a (upper edge AD) of display frame outside edge portion 105 may be set larger than that between lower edge 106c (lower edge bc) of display frame inside edge portion 106 and lower edge 105c (lower edge BC) of display frame outside edge portion 105. Furthermore, the distance from upper edge 106a (upper edge ad) of display frame inside edge portion 106 to upper edge 105a (upper edge AD) of display frame outside edge portion 105 may be set larger than the distance from lower edge 106*c* (lower edge bc) of display frame inside edge portion 106 to lower edge 105*c* (lower edge BC) of display frame outside edge portion 105. Accordingly, when the inside edge and the outside edge may be visible from the inside of the passenger compartment, the visible imagery may be provided with a further enhanced perspective effect.

Figure 3B:
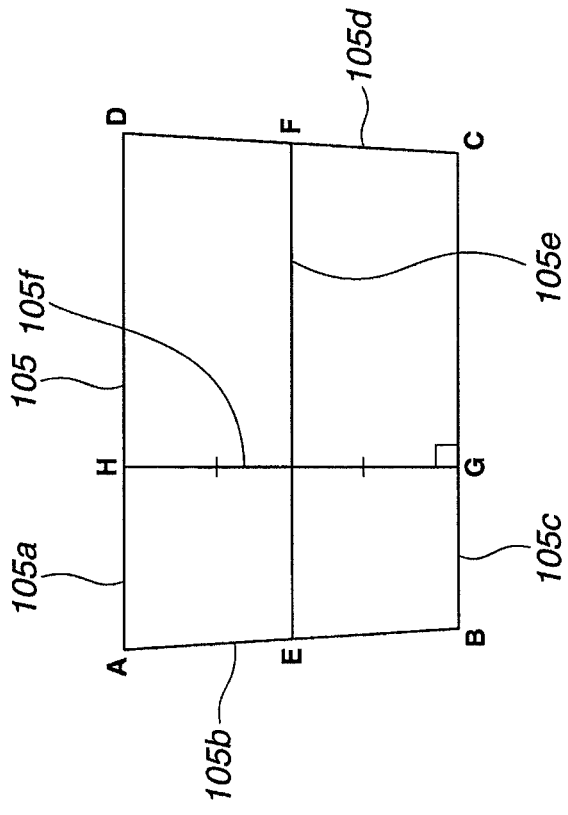
FIG. 3 is a diagram showing shapes in detail in a vehicular display apparatus in accordance with one or more embodiments of the present disclosure.
Figure 3A:
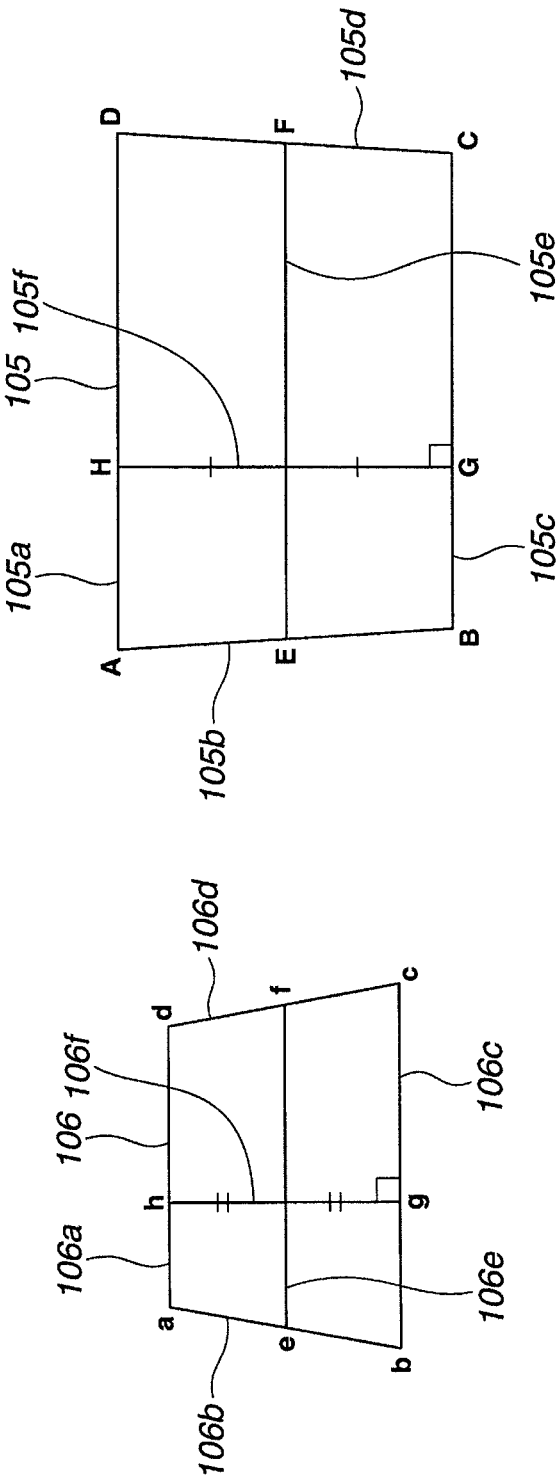

Moreover, as shown in FIGS. 3A and 3B, a ratio 106*e*/106*f* between a width 106*e* (width ef) and a height 106*f* (height gh) of display frame inside edge portion 106 may be set substantially equal to a ratio 105*e*/105*f* between a width 105*e* (width EF) and a height 105*f* (height GH) of display frame outside edge portion 105. Furthermore, width 106*e* (width ef) may be a bisector with respect to height 106*f* (height gh), and may be parallel to upper edge 106*a* (upper edge ad) of display frame inside edge portion 106. Width 105*e* (width EF) may be a bisector with respect to height 105*f* (height GH), and may be parallel to upper edge 105*a* (upper edge AD) of display frame outside edge portion 105. Namely, display frame outside edge portion 105 may be formed portrait, when display frame inside edge portion 106 may be portrait, and display frame outside edge portion 105 may be formed landscape, when display frame inside edge portion 106 may be landscape.

The following describes advantages of one or more embodiments of the present disclosure. Because the difference in length in the vehicle lateral direction between upper edge 106*a* (upper edge ad) of display frame inside edge portion 106 and upper edge 105*a* (upper edge AD) of display frame outside edge portion 105 may be set larger than that between lower edge 106*c* (lower edge bc) of display frame inside edge portion 106 and lower edge 105*c* (lower edge BC) of display frame outside edge portion 105, an illusion may be created that upper edge 106*a* (upper edge ad) of display frame inside edge portion 106 may be appear farther away from a viewer relative to display frame outside edge portion 105, and lower edge 106*c* (lower edge bc) of display frame inside edge portion 106 may appear nearer to display frame outside edge portion 105. This may enhance the perspective effect of display surface 111.

Because display frame outside edge portion 105 may have a substantially trapezoidal shape with upper edge 105*a* (upper edge AD) being longer than lower edge 105*c* (lower edge BC), it may be possible to set the difference between upper edge 105*a* (upper edge AD) of display frame outside edge portion 105 and upper edge 106*a* (upper edge ad) of display frame inside edge portion 106 large, which may enhance the perspective effect.

Because the distance from upper edge 106*a* (upper edge ad) of display frame inside edge portion 106 to upper edge 105*a* (upper edge AD) of display frame outside edge portion 105 may be set larger than the distance from lower edge 106*c* (lower edge bc) of display frame inside edge portion 106 to lower edge 105*c* (lower edge BC) of display frame outside edge portion 105, the visually recognized imagery may be provided with a further enhanced perspective effect.

Because display frame part 115 may be disposed between meter sections 125, it may be possible to efficiently use the space therebetween.

Because display surface 111 may be inclined in the vehicle forward direction with respect to meter base surface 121 so that display surface 111 may be located farther from a viewer with respect to meter base surface 121, a perspective effect may be provided.

Because the imagery on display surface 111 may be in the form of a perspective view from the rear side of the vehicle, with display frame part 115, the imagery may be provided with a perspective effect similar to an actual perspective effect sensed in a forward view, so that the perspective effect may be provided with no abnormal feel.

In one or more embodiments of the present disclosure, vehicular display apparatus 100 may be provided at a central portion or a passenger side portion of instrument panel 130, so as to obtain similar effects. Although opening 107 may be provided with no cover or lens in one or more embodiments of the present disclosure, the opening 107 may be provided with a transparent clear panel or a lens surface.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A display apparatus provided on a surface of a panel, the display apparatus comprising:
    a quadrangular window section provided in the surface;
    an image display surface disposed in and recessed from the quadrangular window section;
    a frame configured to surround the image display surface and extend from the image display surface to the quadrangular window section;
    wherein the frame comprises:
        an inside edge formed in a substantially trapezoidal shape having a shorter upper edge and a longer lower edge; and
        an outside edge formed in a quadrangular shape conforming to the quadrangular window section,
    wherein a difference in length in a lateral direction between the shorter edge of the inside edge and an upper edge of the outside edge is set larger than a difference in length in the lateral direction between the longer edge of the inside edge and a lower edge of the outside edge.

2. The display apparatus of claim 1, wherein the outside edge comprises a substantially trapezoidal shape with the upper edge longer than the lower edge.

3. The display apparatus of claim 1, wherein a distance from the shorter edge of the inside edge to the upper edge of the outside edge is longer than a distance from the longer edge of the inside edge to the lower edge of the outside edge.

4. The display apparatus of claim 1, wherein the panel comprises an instrument panel of a vehicle.

5. The display apparatus of claim 4, wherein the frame is disposed between substantially circular meters provided on the instrument panel.

6. The display apparatus according to claim 4, wherein the image display surface is inclined in a vehicle forward direction with respect to the panel.

7. The display apparatus according to claim 4, wherein an image displayed on the image display surface comprises a perspective view from a rear side of the vehicle.

8. The display apparatus of claim 4, wherein the image display surface is configured to be visible from an inside of a passenger compartment of the vehicle, and wherein the image display surface is disposed on a vehicle forward side of the window section so as to display imagery in a position corresponding to the window section.

9. A display apparatus provided on a display surface of a panel, the display apparatus comprising:
    a quadrangular window section provided in the display surface;
    a means for displaying an image provided in the display surface;

a frame configured to surround the means for displaying an image and extend from the means for displaying an image to the quadrangular window section;

wherein the frame comprises:

an inside edge formed in a substantially trapezoidal shape having a shorter upper edge and a longer lower edge; and an outside edge formed in a quadrangular shape conforming to the quadrangular window section, wherein a difference in length in a lateral direction between the shorter edge of the inside edge and an upper edge of the outside edge is set larger than a difference in length in the lateral direction between the longer edge of the inside edge and a lower edge of the outside edge.

10. The display apparatus of claim 9, wherein the outside edge comprises a substantially trapezoidal shape with the upper edge longer than the lower edge.

11. The display apparatus of claim 9, wherein a distance from the shorter edge of the inside edge to the upper edge of the outside edge is longer than a distance from the longer edge of the inside edge to the lower edge of the outside edge.

12. The display apparatus of claim 9, wherein the panel is an instrument panel of a vehicle.

13. The display apparatus according to claim 12, wherein the means for displaying an image is inclined in a vehicle forward direction with respect to the panel.

14. The display apparatus of claim 12, wherein the image display surface is configured to be visible from an inside of a passenger compartment of the vehicle, and wherein the image display surface is disposed on a vehicle forward side of the window section so as to display imagery in a position corresponding to the window section.

15. A method to display an image on a display surface of a panel, the method comprising:

disposing a quadrangular window on the display surface of the panel;

disposing an image display surface in the quadrangular window, wherein the image display surface is recessed from the window;

disposing a frame configured to surround the image display surface and extend from the image display surface to the quadrangular window section;

wherein the frame comprises:

an inside edge formed in a substantially trapezoidal shape having a shorter upper edge and a longer lower edge; and an outside edge formed in a quadrangular shape conforming to the quadrangular window section, wherein a difference in length in a lateral direction between the shorter edge of the inside edge and an upper edge of the outside edge is set larger than a difference in length in the lateral direction between the longer edge of the inside edge and a lower edge of the outside edge.

16. The method of claim 15, wherein the outside edge comprises a substantially trapezoidal shape with the upper edge longer than the lower edge.

17. The method of claim 15, wherein a distance from the shorter edge of the inside edge to the upper edge of the outside edge is longer than a distance from the longer edge of the inside edge to the lower edge of the outside edge.

18. The method of claim 15, wherein the panel comprises an instrument panel of a vehicle.

19. The method of claim 15, wherein the image display surface is recessed from the window in a manner to convey perspective.

20. The method of claim 18, wherein the image display surface is configured to be visible from an inside of a passenger compartment of the vehicle, and wherein the image display surface is disposed on a vehicle forward side of the window section so as to display imagery in a position corresponding to the window section.

* * * * *